United States Patent [19]

Yamada

[11] Patent Number: 4,567,360

[45] Date of Patent: Jan. 28, 1986

[54] OPTICAL READING APPARATUS

[75] Inventor: Shigeru Yamada, Tokyo, Japan

[73] Assignee: Casio Computer Co., Ltd., Tokyo, Japan

[21] Appl. No.: 542,436

[22] Filed: Oct. 17, 1983

[30] Foreign Application Priority Data

Oct. 20, 1982 [JP] Japan .................................. 57-182736

[51] Int. Cl.⁴ ............................................. G06K 7/10
[52] U.S. Cl. .................................... 235/455; 235/454; 235/472
[58] Field of Search .......................... 235/455, 454, 472

[56] References Cited

U.S. PATENT DOCUMENTS 4,240,064 12/1980 Choudhury ......................... 235/455
4,356,389 10/1982 Quirey ................................. 235/455

Primary Examiner—Harold I. Pitts
Attorney, Agent, or Firm—Pennie & Edmonds

[57] ABSTRACT

An optical reading apparatus of the invention has a light source and a light-receiving unit for receiving light reflected from a data recording medium on which data is recorded and for producing an electrical signal corresponding to an intensity of received light. The light source is driven by a driving circuit. An electrical signal from the light-receiving unit is recognized by a recognizing circuit. The apparatus also has a time counter for producing a signal of a constant period and a detection circuit for detecting if the electrical signal is produced from the light-receiving unit. The driving circuit turns on/off the light source at a proper timing in accordance with ON and OFF signals supplied from a signal generating circuit.

9 Claims, 4 Drawing Figures

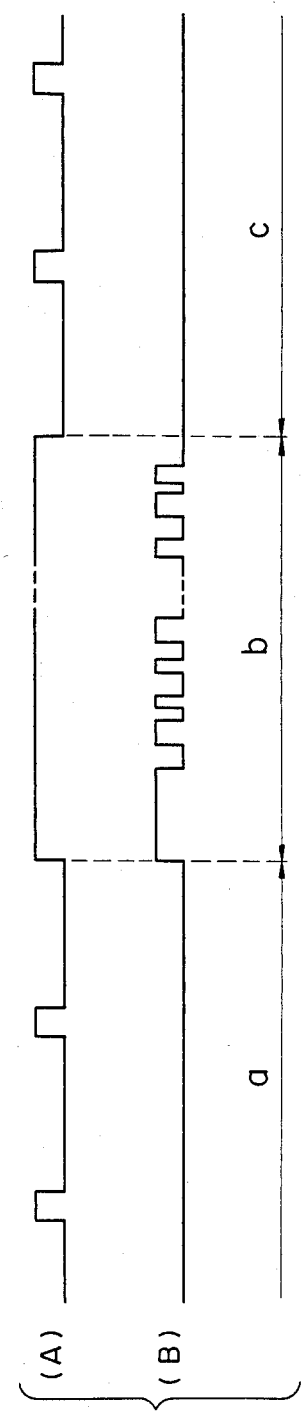

OPTICAL READING APPARATUS

BACKGROUND OF THE INVENTION

The present invention relates to an improvement in an optical reading apparatus for reading bar codes or the like.

An optical reading apparatus for reading bar codes for data input to an electronic cash register or the like is known. The apparatus illuminates, by, e.g., a light-emitting diode, a label on which a price or the like is printed in the form of bar codes. The difference in reflectivity due to presence/absence of bars of a code is converted to an electrical signal, thereby reading bar codes.

However, in an optical reading apparatus of this type, if the light-emitting diode is turned on constantly even when the bar codes are not read, power consumption is increased and is disadvantageous from the economical point of view. In view of this problem, it has been proposed to arrange a switch for turning on the light-emitting diode as needed. Thus, the switch is operated to turn on the light-emitting diode before starting reading operation, thereby decreasing the overall power consumption. However, this method requires incorporation of a switch and a switching operation for turning on/off the light-emitting diode for each reading operation. This resulted in cumbersome operation.

SUMMARY OF THE INVENTION

The present invention has been made in consideration of this and has for its object to provide an optical reading apparatus which automatically turns on a light-emitting element before starting to read bar codes without requiring a switching operation and which saves power.

In order to achieve the above objects, an optical reading apparatus of the present invention comprises a light source for emitting light for illuminating a data recording medium on which data is recorded; a light-receiving unit for receiving light reflected from said data recording medium and for generating an electrical signal corresponding to an amount of the received light; light source driving means, connected to said light source, for driving said light source; recognizing means, connected to said light-receiving unit, for recognizing the data recorded on said data recording medium in accordance with the electrical signal from said light-receiving unit; timing signal generating means for generating a signal of a predetermined period; detecting means for detecting whether or not the electrical signal is generated from said light-receiving unit; and signal generating means for supplying an ON signal to said light source driving means during a period from a time when said detecting means detects the electrical signal to a time when said recognizing means completes recognition of the data recorded on said data recording medium, said ON signal causing said light source driving means to turn on said light source, and for alternately supplying said ON signal and an OFF signal to said light source driving means when said electrical signal is not detected, said OFF signal causing said light source driving means to turn off said light source.

Since the optical reading apparatus of the present invention has the configuration as described above, it can operate with small power consumption and can automatically turn on a light-emitting element before starting reading bar codes. Thus, an optical reading apparatus which does not require a switching operation and which saves power is provided.

BRIEF DESCRIPTION OF THE DRAWINGS

The accompanying drawings show an embodiment of the present invention, in which:

FIG. 4(A) shows the waveform of the drive current of a light-emitting element and FIG. 4(B) shows the waveform of the output signal from an A/D converter.

DETAILED DESCRIPTION OF THE PREFERRED EMBODIMENT

Figure 1:
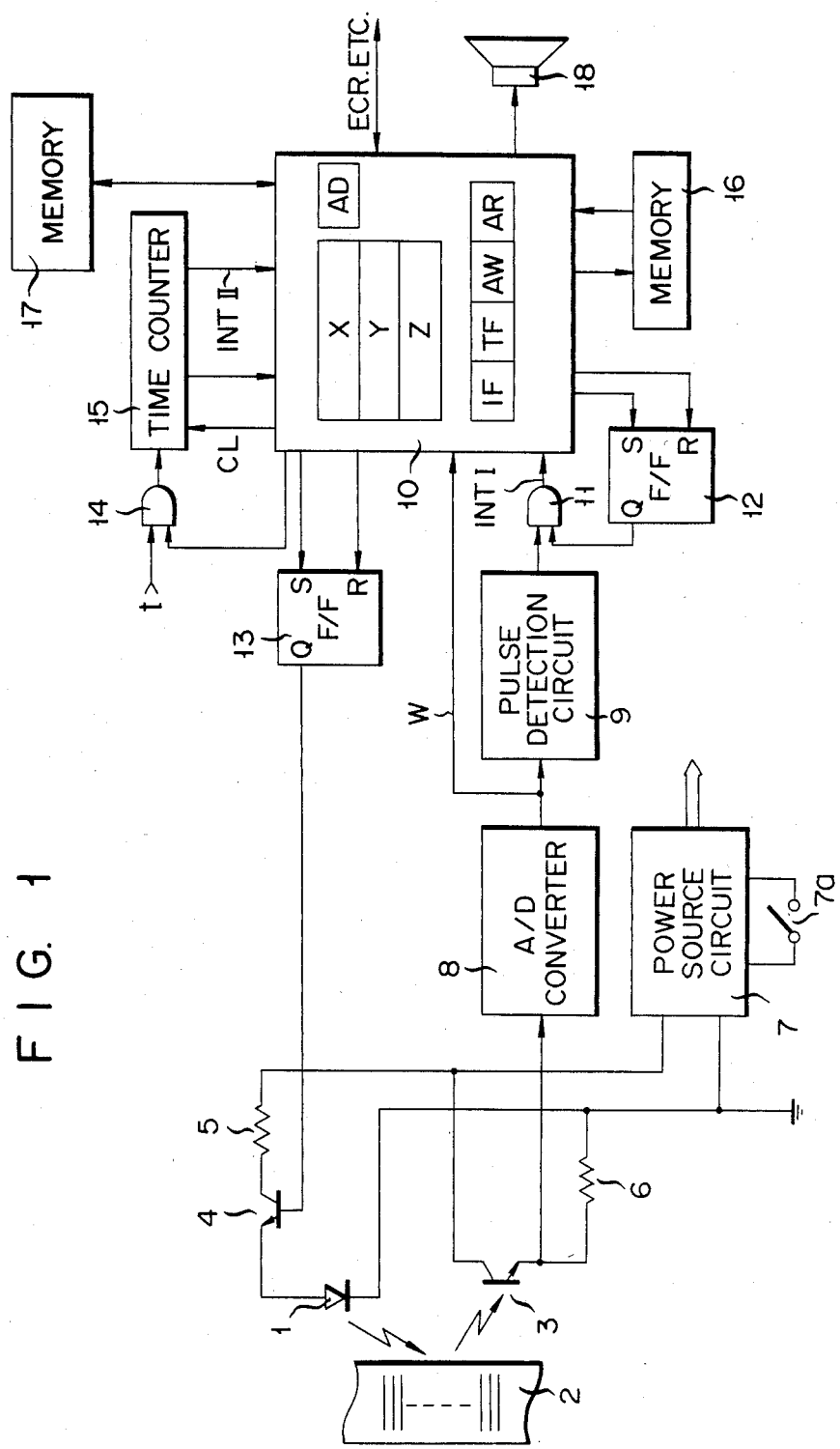
FIG. 1 is a block diagram of an optical reading apparatus of this embodiment.

The preferred embodiment of the present invention will now be described with reference to FIGS. 1 to 4. Referring to FIG. 1, light from a light-emitting element 1 such as a light-emitting diode illuminates a a label 2 on which price or the like is printed in the form of bar codes in black and white. A light-receiving element 3 receives the light which is reflected by the label 2. The light-receiving element 3 comprises, for example, a phototransistor and generates an electrical signal corresponding to intensity of light received. The light-emitting element 1 is connected to a power source circuit 7 through the emitter-collector path of a transistor 4 and through a resistor 5 connected in series therewith. The light-receiving element 3 is also connected to the power source circuit 7 through a resistor 6. The light-emitting element 1 is turned on/off in accordance with the ON/OFF state of the transistor 4. The power source circuit 7 uses, for example, a cell as a power source and has a power source switch 7a. The power source circuit 7 supplies drive voltages to the various circuits and elements.

An output signal from the light-receiving element 3 is supplied to an A/D (analog-to-digital) converter 8 to be converted into a digital signal W. The digital signal W from the A/D converter 8 is supplied to a pulse detection circuit 9 and a CPU 10. The pulse detection circuit 9 generates a trigger pulse in synchronism with the leading and trailing edges of the input signal W. The trigger pulse from the pulse detection circuit 9 is supplied to one input terminal of an AND gate 11. An output signal from the AND gate 11 is supplied to the CPU 10.

The CPU 10 controls operations of various circuit and devices. The CPU 10 has various registers such as X, Y and Z registers as well as flag registers IF and TF and address registers AW, AR and AD. The CPU 10 supplies a control signal to the S or R input terminal of an RS type flip-flop 12. A Q output from the flip-flop 12 is supplied to the other input terminal of the AND gate 11. When the Q output from the flip-flop 12 is at H level, the AND gate 11 is opened to transmit another input signal. When the AND gate 11 is opened, a trigger pulse from the pulse detection circuit 9 is supplied to the CPU 10 as an interrupt signal INTI. The CPU 10 also supplies a control signal to the S or R input terminal of an RS type flip-flop 13 so as to set or reset it, respectively. A Q output from the flip-flop 13 is supplied to the base of the transistor 4 so as to control its ON/OFF state. Thus, the light-emitting element 1 is turned on periodically as will be described later. The CPU 10 also supplies a signal of H level to one input terminal of an AND gate 14 so as to open the gate 14. Then, a clock signal t having a predetermined frequency and supplied from a circuit (not shown) to the other input terminal of the AND gate 13 is supplied to a time counter 15. The time counter 15 counts the clock signal t received through the AND gate 14. The count data obtained by such counting operation is fetched in the CPU 10. The count data of the time counter 15 is cleared in response to a clear signal CL from the CPU 10. When the count of the time counter 15 overflows, the time counter 15 supplies a carry signal as an interrupt signal INTII to the CPU 10.

The CPU 10 is connected to memories 16 and 17 so as to exchange data therewith. The memories 16 and 17 are RAM (Random Access Memory) and data can be written therein or read out therefrom under the control of the CPU 10. The count data of the time counter 15 is written and stored in the memory 16. The count data stored in the memory 16 is decoded by the CPU 10 and is written in the memory 17. The data written in the memory 17 is transferred to, for example, an ECR in response to a data transfer request from the ECR. In response to an alarm command from CPU 10, a speaker 18 produces a sound to signal an error or the like.

Figure 2:
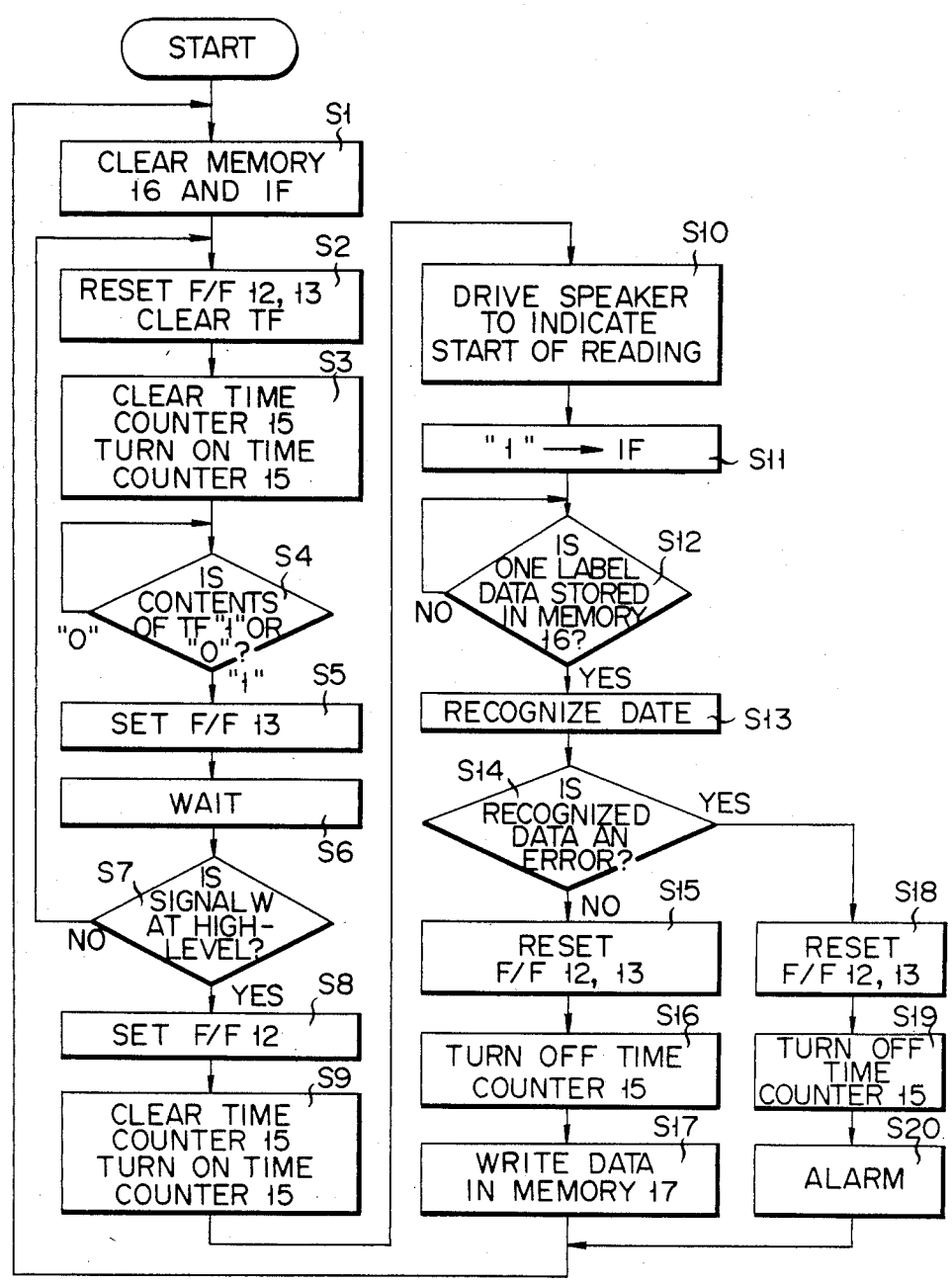
FIGS. 2 and 3 are flow charts for explaining the mode of operation of the optical reading apparatus shown in FIG. 1.
Figure 3:
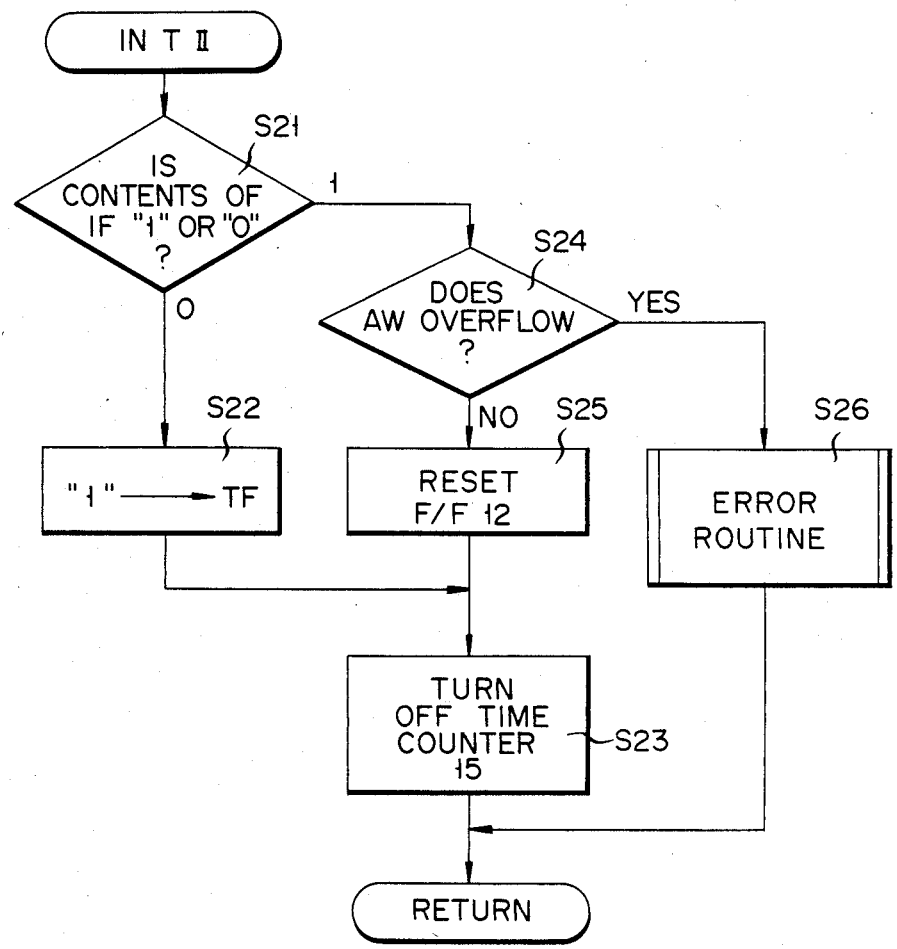

The mode of operation of the embodiment described above will now be described with reference to the flow charts shown in FIGS. 2 and 3. The main flow chart of the CPU 10, which is executed upon power on, will first be described with reference to FIG. 2. Referring to FIG. 2, in step S1, initialization is performed to clear the flag registers IF and contents of the memory 16. The flow then advances to step S2. In step S2, the flip-flop 12 is reset, whereby the AND gate 11 is closed and prohibits input of the interrupt signal INTI to the CPU 10. Subsequently, the flip-flop 13 is reset. Then, the transistor 4 is turned off to deenergize the light-emitting element 1, and the contents of the flag register TF is cleared. In step S3, the CPU 10 clears the contents of the time counter 15 and operates the AND gate 14 so as to start the operation of the time counter 15. In other words, when the light-emitting element 1 is deenergized, the time counter 15 starts counting the pulses of the clock signal t. The flow then advances to step S4 wherein it is discriminated if the contents of the flag register TF is "0" or "1". A signal "1" is set in the flag register TF when a carry signal is produced from the time counter 15 and the subroutine to be described later is executed in response to an interrupt signal INTII.

Upon power on, the contents of the flag register TF is set to be "0" in step S1. The flow waits until "1" is set in the flag register TF in step S4. When the predetermined time period has elapsed from deenergization of the light-emitting element 1 and "1" is set in the flag register TF, the flow advances to step S5 wherein the flip-flop 13 is set. Then, the transistor 4 is turned on to energize the light-emitting element 1. In view of the response characteristics of the light-emitting element 1 and the like, in step S6, the wait state is sustained so as to delay the program processing for a predetermined time. This can be performed by a software timer. The program then advances to step S7. In step S7, it is checked if the signal from the A/D converter 8 is at H level so as to determine whether readout of the bar codes is to be started. When a label 2 on which bar codes are printed is scanned, scanning is started from the blank (white) portion next to the bar code recording region. When this blank portion is scanned, an output signal W from the A/D converter 8 is at H level. Accordingly, whether or not reading of bar codes is to be started can be detected by detecting the output state of the A/D converter 8. When the signal W produced from the A/D converter 8 is not at H level, which corresponds to a white bar, in step S7, the flow returns to step S2. In step S2, the flip-flop 12 is reset and the above operation is repeated. As a result, the light-emitting element 1 is turned on periodically until a start of reading operation of bar codes is detected.

When the signal of H level corresponding to the blank portion of the label 2 is detected in step S7 while the light-emitting element 1 is periodically turned on, the flow advances from step S7 to step S8 wherein the operation of reading bar codes starts. In this case, the flip-flop 13 is kept set and the transistor 4 is turned on. Thus, the light-emitting element 1 is kept on to allow reading of the bar codes. The flip-flop 12 is set in step S8, thereby the AND gate 11 is opened and a state is established wherein an interrupt can be performed in response to the interrupt signal INTI. In step S9, the CPU 10 clears, the contents of the time counter 15 and starts its counting. In step S10, the CPU 10 controls the speaker 18 to produce an alarm sound to signal start of the reading operation of bar codes. The flow then advances to step S11 wherein "1" is set in the flag register IF. A signal "1" is set in the flag register IF when reading operation of bar codes is started. In step S12, it is checked if bar code data of one label is stored in the memory 16. In this case, since the interrupt subroutine is performed in response to the interrupt signal INTI, the count data of clock pulses of the clock signal t, i.e., a value corresponding to the width of each bar of the bar codes is stored in the memory 16.

The interrupt subroutine will now be described. When an output signal from the light-emitting element 3 is supplied to the A/D converter 8, it is converted to a digital signal W and is supplied to the pulse detection circuit 9. An output signal from the pulse detection circuit 9 is supplied to the CPU 10 through the AND gate 11. Then, the CPU 10 performs the interrupt operation in response to the interrupt signal INTI. In response to the interrupt signal INTI, the CPU 10 increments the contents of the address register AW by one. Subsequently, the CPU 10 receives the count data of the time counter 15 and stores it in the area of the memory 16 which is addressed in accordance with the contents of the address register AW, and the contents of the time counter 15 is cleared. These continuous operations are repeated every time an interrupt signal INTI is received. The count data of the time counter 15 fetched in the CPU 10 corresponds to the pulse duration of the trigger signal from the pulse detection circuit 9, i.e., to the width of each bar of the bar codes. This data is sequentially stored in the areas of the memory 16 which is addressed by the address register AW.

The operation of the flow in step S12 and thereafter will now be described referring to FIG. 2. In step S12, the CPU 10 checks if all data of one label is stored in the memory 16. The CPU 10 repeats step S12 until all data of one label is detected to be stored in the memory 16. During this time, the data is sequentially stored in the memory 16 by executing the interrupt subroutine in response to the interrupt signal INTI. When YES is finally obtained, i.e. when all data of one label is stored in the memory 16, in step S12, the flow advances to step S13. In step S13, the data stored in the memory 16 is decoded in units of characters and the decoded data is recognized. In step S14, it is checked if recognized data in step S13 is an error. If NO, i.e. recognized data is not an error, in step S14, the one label data is written at a predetermined address of the memory 17 in step S17. Steps S15 and S16 are performed before step S17 is executed. In step S15, the flip-flops 12 and 13 are reset to prohibit generation of the interrupt signal INTI and to deenergize the light-emitting element 1. In step S16, the time counter 15 is turned off. When a recognized data is detected to be an error in step S14, the flow advances to step S20 through steps S18 and S19 wherein the same operation as in steps S15 and S16 is performed. In step S20, the speaker 18 is energized to produce an alarm sound.

After the data is written in the memory 17 in step S17 and the alarm sound is produced in step S20, the flow returns to step S1. Since the operation is performed in the manner as described above, the light-emitting element 1 is periodically turned on until a read start is detected in step S7.

The interrupt subroutine performed in response to the interrupt signal INTII will now be described with reference to the flow chart shown in FIG. 3. When a carry signal is produced from the time counter 15, it is checked in step S21 as to whether the contents of the flag register IF is "0" or "1". When the contents of the flag register IF is detected, it can be determined whether the carry signal from the time counter 15 is to periodically turn on the light-emitting element 1 or corresponds to the width of each bar of the bar codes. When the contents of the flag register IF is "0", the light-emitting element 1 must be periodically turned on. In this case, the flow advances to step S22 wherein a signal "1" is set in the flag register TF. The flow then advances to step S23 wherein the time counter 15 is turned off. The flow then returns to the main flow. If the contents of flag register 1F is detected to be "1" in step S21, the flow advances to step S24. In step S24, it is checked if the address register AW overflows exceeding the last address of the memory 16. If NO, i.e. the AW does not overflow, in step S24, the flow goes to step S25. In step S25, the CPU 10 resets the flip-flop 12 and prohibits generation of the interrupt signal INTI and the flow goes to step S23. After the time counter 15 is turned off in step S23, the flow returns to the main flow in FIG. 2.

On the other hand, if the contents of the address register AW is detected to be overflowing in step S24, the flow advances to step S26. Step S26 is an error routine wherein an error processing is performed. The error processing consists of processing of steps S1, S18, S19 and S20. In this case, after step S26 is performed, the flow returns to the main flow shown in FIG. 2.

The reading operation is completed in accordance with the series of operations as described above.

In the optical reading apparatus having the configuration as described above, the drive current supplied to the light-emitting element 1 is as shown in FIG. 4(A). An output signal from the A/D converter 8 is as shown in FIG. 4(B). In a period a in FIG. 4 before detection of a read start, the light-emitting element 1 is periodically turned on. However, when the output signal W from the A/D converter 8 goes to H level and the read start is detected by the CPU 10, the light-emitting element 1 is kept ON as in a period b in FIG. 4 wherein the bar codes can be read. Then, signals corresponding to the bar codes are produced from the A/D converter 8 (FIG. 4(B)). When the CPU 10 detects a read end in accordance with the output signal from the A/D converter 8, the light-emitting element 1 is periodically turned on again as in a period c in FIG. 4.

The present invention may be applied to a hand scanner or a stationary scanner. The present invention is not limited to a bar coder reader but may be applied to an optical character reader or the like.

What is claimed is:

1. An optical reading apparatus comprising:
   a light source for emiting light for illuminating a recording medium on which data is recorded;
   a light receiving unit for receiving the light reflected from said recording medium and for generating an electrical output signal corresponding to the amount of light;
   light source driving means connected to said light source for driving said light source;
   detecting means connected to said light receiving unit for detecting the level of the output signal of said light receiving unit and for generating a signal every time the level of the output signal of said light receiving unit changes;
   time counting means for counting clock pulses and producing an output signal upon reaching a predetermined count;
   memory means for storing data;
   processing means including:
   first flag register means for storing data for a predetermined time after receiving said output signal from said counting means, during which said driving means drives said light source;
   second flag register means coupled to said light receiving unit for storing an indication that data is being read from said recording medium, and
   means connected to said detecting means, said time counting means and said memory means for counting with said time counting means the duration of signals from said detecting means representative of the data being read from said recording medium, for causing said memory means to store counts from said counting means in response to said signals from said detecting means, for detecting that all data from said recording medium has been stored in said memory means, and upon detecting such storage for analyzing the counts stored in said memory means to determine if they represent valid data.

2. An apparatus according to claim 1 wherein:
   said memory means comprises a first and a second memory means;
   said first memory means stores said counts from said counting means;
   said second memory means stores validated data.

3. An apparatus according to claim 1, further comprising means for indicating to a user that data reading from said data recording medium has commenced.

4. An apparatus according to claim 3, wherein said indicating means is a loudspeaker.

5. An aparatus according to claim 1, wherein said processing means detects a bar code on said data recording medium.

6. An apparatus according to claim 1, wherein said processing means detects a character on said data recording medium.

7. An optical reading apparatus comprising:
   a light receiving unit for receiving light reflected from said recording medium and for generating an electrical output signal in response thereto;

a light source driving means for driving said light source;

means connected to said light receiving unit for generating a signal every time the level of the output signal from the light receiving unit changes;

time counting means for counting clock pulses;

first flag register means which is set when said time counting means reaches a predetermined count and is reset a predetermined time therafter unless light is received by said light receiving unit;

second flag register means which is set when the light receiving unit receives light reflected from said recording medium and is reset when the data recorded on said recording medium has been fully read;

memory means for storing data; and processing means connected to said generating means, said time counting means and said memory means which when said second flag register means is set and in response to said signal from said generating means counts with said time counting means the duration of signals from said light receiving means representative of the data being read from said recording medium and stores in said memory means data representative of the duration of the signals from said light receiving means;

said processing means further comprising means for determining if the data stored in said memory means is valid data.

8. The apparatus of claim 7, wherein said light receiving unit comprises:

an analog-to-digital converter for converting the electrical signal from the light receiving unit into a digital signal, said digital signal being the output signal from said light receiving unit that is applied to said generating means.

9. The apparatus of claim 8, further comprising gate means controlled by said processing means for applying the output of said generating means to said processing means only when light has been receiving by said light receiving unit.

* * * * *